(12) United States Patent
Baldwin

(10) Patent No.: X8587
(45) Date of Patent: Jan. 16, 1835

(54) STEAM, ENGINE, ROTARY & BOILER

(76) Inventor: Ethan Baldwin

United States Patent

Patent No.: X8587

Ethan Baldwin
Letters Patent

The Schedule referred to in these Letters Patent and mak-
ing part of the same containing a description in the words
of the said Ethan Baldwin himself of his improvement
in the Rotary Steam Engine and also an improved
boiler for generating Steam.

To all to whom these presents shall come.

Be it known that I Ethan Baldwin of Washington in
the County of Washington and District of Columbia have invent-
ed a new & useful improvement in my Rotary Steam Engine
and also an improved boiler for generating Steam and that
the following is a full and exact description of the construction
and operation of the said Engine & Boiler as invented or impro-
ved by me. 1st The power wheel instead of being a horizon-
tal plane when finished has a flange on each side rising
perpendicular to the plane of the wheel a distance equal
to the width of said plane, so that when finished the circu-
lar opening will form three sides of a perfect square or near-
ly so, being a little wider at the periphery than at the
plane of the wheel for benefit of packing the cross-head hereaf-
ter to be described. 2nd Into this wheel are sunk four mor-
tices at right angles which cut entirely through the plane
of the wheel and from 1/4 to 3/4 of an inch beyond on each
side which will necessarily produce a corresponding slaught-
er gain of from 1/4 to 3/4 of an inch deep in the flanges of
the wheel. These mortices should descend perpendicular
to the plane of the wheel about 1/2 an inch beyond the
whole depth of the side flange, so that a valve which would
sink entirely below the plane of the wheel and pass under
the cross-head where the steam is shut off without touch-
ing, would leave 1/2 an inch in the mortice, when its
[illegible]

point was out even with the periphery of the flange of the
wheel. and thus. its lower end resting on the plane of the wheel.
its sides in the slaughts or gains in the flanges and its point
against the cylinder hereafter to be described. it would
completely close the opening of the wheel. These receptacles
are filled with four solid pieces of metal from 1 to 3 inch
es thick according to the size of the Engine called
valves which descend below the plane of the wheel by
their own gravity when above the horizon. at which time
the steam is off and they are perfectly loose in the gains. and mor
tices but after they have sunk below the horizon in the revolving
wheel they descend by the same law of gravity till the point of
the valve rests on the cylinder where they take the steam, and
by its pressure. become fixed in that position and act as a
piston till they have ascended just above the horizon. where
the point passes an opening in the cylinder which discharges
the steam and the valve is loose again thus substituting a
direct and perpendicular instead of a circular & rotary
motion. a sliding for a folding valve. a solid oblong
piece of metal of the most simple form & greatest ease
of construction. perfectly free from all liability to breaking
or derangement. instead of the circular folding valve mov
ing on either axle or hinge so intricate & difficult of construc
tion and continually liable to break or be deranged —
The side of the valve against which the steam acts should
be a plane even surface except at the point where a large
flange should be left to receive the oakum or packing
and a plate with screws to confine it. provided experi
ence should prove that the point of the valve will run
more perfectly steam tight in the cylinder with soft
packing than the plane end of the valve ground to the cyl
inder with emery. The other side of the valve should be
as dishing towards the centre as may be consistent with the the strength required — that as the valve rises above the hori-
zon the oil may run into the dish. and be carried on with
the wheel. and also that the valve may be easily ground
steam tight round the edges. and not be too heavy. —
On the outside of the perpendicular flanges of the wheel.
a little below the periphery there is a flange of from
1 to 3 inches deep at right angles with the other to form
part of the groove for the packing and which will run
against the packing whether soft or metallic or both.
3. The cylinder. which is a hoop of iron. of sufficient
capacity to admit the wheel and project from 1 to 3
inches beyond the perpendicular flange of the wheel and
from the other part of the groove to receive the packing.
A flange rises at each end of the cylinder above its bar-
rel whose height and thickness is proportioned to its size
with a horn on each side of the barrel to fasten the whole
to its proper frame. This cylinder is bored out in the
most perfect manner so as precisely to admit the
wheel and at each end just opposite the outer edge
of the perpendicular flange of the wheel. an offset is
turned in the cylinder to form one half of the groove
for the packing the other half is formed by the horizon-
tal flange of the wheel and the outer edge of the perpendic-
ular flange. in the bottom of this groove near its centre is
the joint between the wheel and cylinder. which is to
be closed by the packing. when the wheel is inserted in-
to the cylinder and the lower half on both sides made
steam tight by the packing. the opening round the wheel
in the language of steam Engineers may be termed a
circular cylinder. instead of a straight one. and the
valves being always. out on the lower side of the wheel
where. alone. the steam can act. and against which
it constantly does act. may be termed a successive or
oscillating everlasting piston. instead of the usual or reciprocating one
now in use. A little above the horizon on one side there
is a large opening in the cylinder, through which the steam
is discharged. the instant the point of the valve passes it.
Round this opening is fitted a large pipe steam tight
called the discharging pipe. through which the steam
is conveyed to the condenser that it may again be re-
turned to the boiler. Directly opposite the point where
the steam is discharged is another opening broad enough
to admit the valves to be slipped in and out and from
2 to 6 inches deep according to the size of the engine.
On each side of this opening but exactly even with
it, a piece of iron is so fitted in, that it will close
like a valve. the space in which the steam operates
which pieces will be immoveably fixed to the cylinder by
screws. and to each of these pieces will be cast sections
of eccentric circles. the first to catch the point of the
valve. and force it into the wheel. like a guard that
it may pass under the cross-head & packing or bulk-
head. against which the steam reacts; the other to
act also as a guard to let it slide gently down in-
to the cylinder. after it has passed the bulk-head—
Between these pieces of iron thus fixed, under heavy
screws will be the packing, constituting the cross or
bulk-head where the steam is shut off, and pre-
vented from acting or moving in that direction on
the wheel. This packing will be either metallic
or soft or a compound of both as experience shall
prove which is most useful. 4th Each end of the cylin
der will be closed by a plane-iron head whose diame
ter will be equal to that of the flanges on the cylin
der to which flange it will be firmly confined by
screws. On these heads will be turned lateral or hori
zontal zontal flanges to enter the grooves formed by the cylinder
and wheel, into which they will be fitted in the neat-
est manner, so that when the flange, which is the pack-
ing plate, is hard pressed in the grooves by the screws, with
the packing under it or them, neither steam nor oil can
escape by these heads, nor can the cylinder move the
least in any direction, without the heads moving also.
These heads are perforated at the centre for the recep-
tion of the axle or shaft into which it is fitted in
the neatest manner possible, that no pressure of steam
between the wheel and and cylinder may produce
any alteration in their relative circles. Iron projec-
tions should be cast on the out side of these heads at
the centre for the reception of open brass boxes with a
key on the upper side, that as the axle and aperture
in which it revolves wear away, the axle may be
compelled, by the keys to keep its centre. The axle
must be packed under the brass boxes at the centre
so that these heads and the whole wheel may always
run full of tallow without the possibility of its escap-
ing. In the bottom of the cylinder will be a cock to
draw off the tallow; or water at any time when ne-
cessary. Immediately in the upper side of the cross-head
will be a cock also for the supply of tallow, and one
through the flange of each head for their supply. The
steam should be admitted through the lower piece of
iron enclosing the cross head and forming the lower
guard. — Specification of the Improved boiler.
This boiler consists in the first place of a semicylinder about
5 feet long made of strong boiler iron the top of which
is a flat plane surface a little above the centre of the
boiler, or it may be slightly depressed in the centre
and the two sides of the plane represent two sections
of of very large circles. A row of tubes or heaters of from 4
to 6 inches diameter will descend perpendicularly from
the centre of this plane and pass through the bottom of the
semicylinder, so that the water above the plane will com
municate with that below it. In addition to those
supports there will be a row of strong bolts on each side
of these heaters up through the outside cylinder, to secure
it against the pressure of heavy steam. The front end
of this semi cylinder will be closed by two doors open
ing to the centre for the admission of fuel. the back end
will be closed by a strong plate of iron perforated and
filled with tubes or flues of from 4 to 6 inches diameter as
thick as they can be set. These flues will be from 15 to 30
feet long according to the size of the boiler and will
pass out at its other extremity. The plane of the semi-
cylinder & upper range of flues should constitute one uni
form plane, that they may all be covered with water at
the same time. The whole must be enclosed in a few
feet cylinder of strong boiler iron hooped every two feet
with a strong iron hoop to prevent the possibility of
explosion. In a large boiler the cylinder should be
from 4 feet to 4½ feet diameter. It should be larger
at each end than in the centre, that the deposite
may naturally incline towards the ends. This outside
cylinder is connected with the semi cylinder by means
of draughts or openings extending laterally along the
sides, and after proper pieces of iron are inserted be-
tween, they are riveted together so as to constitute grating
between the hollow bars of which, the air is freely ad-
mitted to the fire, and through which hollow bars the
water passes freely with the deposite, down to the centre
under the fire, being the lowest part of the whole boil
er, where the whole of the deposite will necessarily be
collected collected. Directly in the bottom, under the perpendicular tubes, there will be no grating for a space of from 8 to 12 inches, the outer and semi cylinder at this point being unconnected and distant from each other from 2 to 5 inches leaving no obstruction to the extraction of the deposits or sediment at the front end through the bonnet or door, left for that purpose. There will be a bonnet in the back end for the same purpose. When the boiler is set, the brick work will not be permitted to approach nearer the outside cylinder than [6] inches till it rises to a level with the water line in the boiler, and then a range of brick will project tight against the boiler at the back end, and directly over the flues & along the sides, till within two feet of the front, then it will stop and let the fire rise, after passing out of the flues & traversing the sides of the boiler, and run back over the top of the boiler, to the back end again, before it takes the smoke-stack. A sheet iron cover, itself covered with some non-conductor of caloric, will be set over the boiler resting on the brick work at the sides and at a sufficient distance from the boiler to allow free passage for the fire or heated air to pass through to the smoke-stack. Thus the fire will be compelled to traverse the whole length of the boiler three times before it is permitted to escape. The advantages of this improved boiler over any now known or in use are believed to be the following. 1st the fire is entirely within the boiler surrounded by water, and all extra grating dispensed with. 2nd There is less danger of fire to the boat or machinery. 3d as every part of the boiler is exposed to the fire on one side & to the water or steam on the other, except about [18] inches wide along the bottom of the outside cylinder, on which the sediment sediment collects, there is the greatest possible exposure to the fire which can be made in any boiler; 4th As the flues are set as thick as workmanship can set them, there will be no large column or body of water in the boiler in any place, and for its capacity, this boiler will contain and carry the least possible quantity of water, and as steam is generated with a rapidity proportioned to the thinness of the plates of water exposed to the heated surfaces, so the same number of superficial feet of boiler iron will produce a greater quantity of steam in this form than any other now known. 5th As the fire is made to traverse the boiler three times previous to its escape and is divided into small columns, the whole of whose sides are constantly exposed to the boiler, it is confidently believed that it will impart in its progress all its excess of caloric above the temperature of the steam, to the boiler, so that no heat created by the fuel will pass off unimproved, and it is as confidently believed that the same quantity of fuel in this form of boiler will produce from 50 to 100 pr cent of steam more than any one now known. 6th As no sediment will be deposited on any part of the boiler exposed to the direct action of the fire, the danger of injury to the boiler and consequent explosion from that source will be avoided. 7th The boiler will be much smaller and lighter in proportion to its power than any one now in use. and as all its parts, except the plane over the semi cylinder consists of cylinders or arches, all of which will be small except the out side cylinder, this being made of thick iron and well hooped, it may be safely affirmed that a boiler of this construction, and the same weight of another will be able to produce sustain and exert double the effective power

United States Patent

Patent No.: X8587 power of the other, without the least danger of explosion.

Witnesses

Sam: Stettinius

Thos J. Martin

Ethan Baldwin

One half of this patent belongs to Richard Cazleton. Feby 12th 1835

Ethan Baldwin 2630 wds

Exd
N.G.